US 011106433B2

(12) United States Patent
Walmsley et al.

(10) Patent No.: US 11,106,433 B2
(45) Date of Patent: Aug. 31, 2021

(54) RANDOM NUMBER GENERATOR

(71) Applicant: Oxford University Innovation Limited, Oxford (GB)

(72) Inventors: Ian Walmsley, Oxfordshire (GB); Joshua Nunn, Oxford (GB); Steven Kolthammer, Oxford (GB); Gil Triginer Garces, Oxford (GB); David Drahi, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 204 days.

(21) Appl. No.: 16/348,273

(22) PCT Filed: Oct. 20, 2017

(86) PCT No.: PCT/GB2017/053180
§ 371 (c)(1),
(2) Date: May 8, 2019

(87) PCT Pub. No.: WO2018/087516
PCT Pub. Date: May 17, 2018

(65) Prior Publication Data
US 2019/0258458 A1 Aug. 22, 2019

(30) Foreign Application Priority Data

Nov. 10, 2016 (GB) ...................... 1618978

(51) Int. Cl.
*G06F 7/58* (2006.01)
*G06N 10/00* (2019.01)
*H04L 9/08* (2006.01)
(52) U.S. Cl.
CPC ............. *G06F 7/588* (2013.01); *G06N 10/00* (2019.01); *H04L 9/0852* (2013.01)

(58) Field of Classification Search
CPC ........ G06F 7/588; G06N 10/00; H04L 9/0852
(Continued)

(56) References Cited

U.S. PATENT DOCUMENTS 6,986,056 B1 1/2006 Dultz et al.
7,284,024 B1 10/2007 Trifonov et al.
(Continued)

FOREIGN PATENT DOCUMENTS

WO 2007/124089 A2 1/2007
WO 2013/082672 A1 6/2013

OTHER PUBLICATIONS

International Search Report for PCT/GB2017/053180, dated Jan. 23, 2018, pp. 1-14.
(Continued)

*Primary Examiner* — Tan V Mai
(74) *Attorney, Agent, or Firm* — Thomas | Horstemeyer, LLP (57) ABSTRACT

A method (300) for generating random numbers including: mixing (304) a bright quantum state in a first mode with a vacuum input (15), in a two mode transformation for mixing the first mode and an orthogonal second mode; after mixing, detecting (306) the intensity in the first mode, and the second mode; generating random numbers (312) based on the difference between the detected intensity of the first mode and the second mode; and simultaneously to generating random numbers, certifying the numbers as random, based on the sum of the detected intensity of the first mode and the second mode, wherein certifying confirms that the process by which the random numbers are generated is quantum in origin and so the numbers are random.

20 Claims, 3 Drawing Sheets

(58) Field of Classification Search
USPC .................................................. 708/250–256
See application file for complete search history.

(56) References Cited

U.S. PATENT DOCUMENTS 7,428,562 B2    9/2008  Beausoleil et al.
2016/0328211 A1* 11/2016 Nordholt ................. G06F 7/588

OTHER PUBLICATIONS

UK Search Report for GB1618978.9, dated Apr. 25, 2017, pp. 1-3.
Miguel Herrero-Collantes et al: Quantum Random Number Generators, arxiv.org, Cornell University Library, 201 Olin Library Cornell University Ithaca, NY 14853, Apr. 12, 2016 (Apr. 12, 2016), XP080694891, pp. 1-40.
Stipcevic M: Quantum random number generators and their use in cryptography, MIPRO, 2011 Proceedings of the 34th International Convention, IEEE, May 23, 2011 (May 23, 2011), pp. 1474-1479, XP031904507, ISBN: 978-1-4577-0996-8, pp. 1-6.
Osung Kwon, Young-Wook Cho, and Yoon-Ho Kim: Quantum random number generator using photon-number path entanglement Department of Physics, Pohang University of Science and Technology, Pohang 790-784, South Korea *Corresponding author: yoonho@postech.ac.kr; accepted Feb. 18, 2009; posted Mar. 4, 2009 (Doc. ID 106049); published Mar. 19, 2009, pp. 1-5.
Xiongfeng Ma; Zhu Cao, and Xiao Yuan, Source-independent quantum random number generation, Center for Quantum Information, Institute for Interdisciplinary Information Sciences, Tsinghua University, Beijing, China, Aug. 20, 2015, pp. 1-11.
Xiongfeng Ma, Xiao Yuan, Zhu Cao, Bing Qi2 and Zhen Zhang, Quantum random number generation, Center for Quantum Information, Institute for Interdisciplinary Information Sciences, Tsinghua University, Beijing 100084, China, Quantum Information Science Group, Computational Sciences and Engineering Division, Oak Ridge National Laboratory, Oak Ridge, TN 37831-6418, USA, Oct. 30, 2015, pp. 1-30.
Davide G. Marangon, Giuseppe Vallone,Ugo Zanforlin, and Paolo Villoresi, Enhanced security for multi-detector Quantum Random Number Generators, Dipartimento di Ingegneria dell'Informazione, Universita degli Studi di Padova, Padova, Italia, Istituto di Fotonica e Nanotecnologie, CNR, Padova, Italia, May 16, 2016, pp. 1-8.
Davide G. Marangon, Giuseppe Vallone, and Paolo Villoresi, Source-device-independent Ultra-fast Quantum Random Number Generation, Dipartimento di Ingegneria dell'Informazione, Universita degli Studi di Padova, Padova, Italia, Istituto di Fotonica e Nanotecnologie, CNR, Padova, Italia, Sep. 24, 2015, pp. 1-12.

* cited by examiner

RANDOM NUMBER GENERATOR

CROSS-REFERENCE TO RELATED APPLICATIONS

This application is the National Stage of International Application No. PCT/GB2017/053180, filed Oct. 20, 2017, which claims the priority to GB 1618978.9, filed Nov. 10, 2016, which are entirely incorporated herein by reference.

The present invention relates to a random number generator, and to a method for generating random numbers. In particular, but not exclusively, the present invention relates to a self-certified quantum random number generator and/or a method of generating self-certified random numbers based on a quantum mechanical effect.

Random numbers are used in a wide variety of applications, such as encryption, online gaming, scientific modelling (for example, Monte Carlo simulations), high frequency automated share trading and the like. In many of these applications, it is important for the numbers to be truly random, so they cannot be predicted by third parties.

Classical random number generators are implemented in software based algorithms, which can be predicted. Quantum mechanics, on the other hand, is a fundamentally random process, and thus random number generators based on quantum mechanical effects are an area of significant activity.

However, even quantum random number generators can be open to attack from third parties, and so it is desirable to certify that a supposedly random number generator is based on a truly quantum effect. This, in turn, confirms that the distribution of numbers is truly random. Certification can be based on statistical analysis of the distribution of numbers generated, but this is only available once a statistically significant number of numbers is generated, and does not certify the underlying process, and so can still be susceptible to interference.

One existing self-certified quantum random number generator is disclosed in U.S. Pat. No. 7,428,562. This uses a number of measurements of quantum states to generate and certify random numbers. In this random number generator, there are several different measurements to be taken, and the measurements are all single photon measurements. The single photon measurements require detectors with single photon sensitivity, which are expensive, and slow, or require cryogenic temperatures.

Another self-certified quantum random number generator is disclosed in "Source-device-independent Ultra-fast Quantum Random Number Generation" by David G Marangon, Giuseppe Vallone, and Paolo Villoresi (arXiv:1509.07390 [quant-ph], 24 Sep. 2015). In this system, a vacuum input is interfered with a local oscillator (a laser). Phase sensitive heterodyning detection is used to measure the in-phase and out-phase quadrature components of the resultant field. The different quadrature components are conjugate, and so the measurement of one component can provide random numbers, and the second component can provide certification. Photodetectors can be used to detect the output signals, but certification depends on the calibration, stability and security of the local oscillator.

According to a first aspect of the invention, there is provided a method for generating random numbers including: mixing a bright quantum state in a first mode with a vacuum input, in a two mode transformation for mixing the first mode and an orthogonal second mode; after mixing, detecting the intensity in the first mode, and the second mode; generating random numbers based on the difference between the detected intensity of the first mode and the second mode; and simultaneously to generating random numbers, certifying the numbers as random, based on the sum of the detected intensity of the first mode and the second mode, wherein certifying confirms that the process by which the random numbers are generated is quantum in origin and so the numbers are random.

The method may include generating certified random numbers based on the difference between the detected intensity of the first mode and the second mode and the sum of the detected intensity of the first mode and the second mode, such that the numbers are certified when they are generated.

The method may include, after mixing, detecting the intensity in the first mode and second mode; determining the number of particles in the first mode and the second mode, based on the detected intensity; generating random numbers based on the difference between the number of particles in the first mode and the second mode; and certifying the random numbers based on the total number of particles in the first mode and second mode.

After mixing the bright quantum state in the first mode with the vacuum input, each particle may be randomly detected in the first mode or the second mode, such that the difference between the number of particles in the two modes has high entropy.

The method may include, generating random numbers by extracting randomness from a measurement of the difference between the number of particles in the two modes.

Extracting randomness may comprise: generating a binary string based on the difference between the number of particles in the two modes, the binary string having a number of bits based on the total number of particles in the two modes; and providing the binary string to a random number extractor, to extract certified random numbers, wherein the number of random numbers extracted is based on the total number of particles in the two modes.

The method may include, calibrating detectors used to detect the intensity in the first mode and the second mode, such that the number of particles incident on the detector can be estimated based on an output signal of the detector, wherein the detectors are calibrated to underestimate the number of particles.

The method may include, calibrating detectors used to detect the intensity in the first mode and the second mode, to take shot noise into account, by: varying the number of particles incident on the detector; and measuring the noise as a function of the number of incident particles.

The detector may be calibrated with a first source, and the bright quantum state in a first mode is generated by a second source.

The numbers may be certified as random if the total intensity is above a minimum threshold.

The minimum threshold may be representative of detecting 500 particles.

The method may include, for a plurality of measurements, grouping the results based on the sum of the detected intensity of the first mode and the second mode; and for each measurement, generating random numbers based on the difference between the detected intensity in the first mode and the second mode recorded for measurements with the same total intensity.

The bright quantum state may comprise bosons.

The bright quantum state may comprise photons.

The method may include, collecting light from an incident light source.

The modes may be selected from at least: optical polarisation modes; spatial modes; temporal modes; and spectral modes.

The method may include generating the bright quantum state, such that the state is pulsed; and detecting the intensity in the first mode and second mode for each pulse.

Each pulse may include at least 500 particles in the first mode.

According to a second aspect of the invention, there is provided a random number generator including: means for mixing a first mode of a quantum state with a second mode, orthogonal to the first mode, in a two mode transformation; a source for providing a bright quantum state in the first mode to the means for mixing; a vacuum input to the means for mixing, such that the first mode is mixed with the vacuum input; means for detecting the intensity of the first mode and the second mode after mixing; means for generating random numbers based on the difference between the intensity detected in the first mode and the second mode; and means for certifying that the process by which the random numbers are generated is quantum in origin, and so the generated numbers are random, based on the sum of the detected intensity of the first mode and the second mode, wherein the random number generator is arranged to generate random number and certification that the numbers are random at the same time.

The means for generating random numbers may be arranged to generate certified random numbers based on the difference between the detected intensity of the first mode and the second mode and the sum of the detected intensity of the first mode and the second mode, such that the numbers are certified when they are generated.

The means for detecting the intensity in the first mode and the second mode may include means for determining the number of particles in the first mode and the second mode; and wherein the means for generating random numbers and means for certifying random numbers may generate and certify the random numbers based on the number of particles.

After mixing the bright quantum state in the first mode with the vacuum input, each particle may be randomly detected in the first mode or the second mode, such that the difference between the number of particles in the two modes has high entropy.

The random number generator may include: means for generating a binary string based on the difference between the number of particles in the two modes, the binary string having a number of bits based on the total number of particles in the two modes; and means for extracting certified random numbers from the binary string, wherein the number of random numbers extracted is based on the total number of particles in the two modes.

The means for detecting the intensity of the first mode and the second mode after mixing may include: a first detector for detecting the first mode; and a second detector for detecting the second mode.

The detector may be calibrated such that the number of particles incident on the detector can be estimated based on an output signal of the detector, and wherein the detectors are calibrated to underestimate the number of particles.

The numbers may be certified as random if the total intensity is above a minimum threshold.

The minimum threshold may be representative of detecting 500 particles.

The random number generator may include: binning means to group separate measurements, based on the total intensity detected in the first mode and the second mode, wherein the means for generating random numbers generates random numbers based on the difference between the detected intensity in the first mode and the second mode recorded for measurements with the same total intensity.

The bright quantum state may comprise bosons.

The bright quantum state may comprise photons.

The means for detecting may comprise photodiodes.

The source may comprise a means for generating the bright quantum state.

The source may comprise a means for collecting a bright quantum state from a separate source.

The source may be pulsed, and wherein random numbers may be generated from each pulse.

Each pulse may include at least 500 particles in the first mode.

The modes may be selected from at least: optical polarisation modes; spatial modes;

temporal modes; and spectral modes.

The means for mixing may be a 50:50 mode mixer.

The means for mixing modes may comprise: a half wavelength waveplate; and a polarising beam splitter.

The means for mixing may be coupled to the source and the means for detecting by optical fibres.

It will be appreciated that features discussed in relation to a particular aspect or embodiment may also be applied to other aspects or embodiments.

Embodiments of the invention will now be described, by way of example only, with reference to the accompanying figures, in which.

Figure 1:
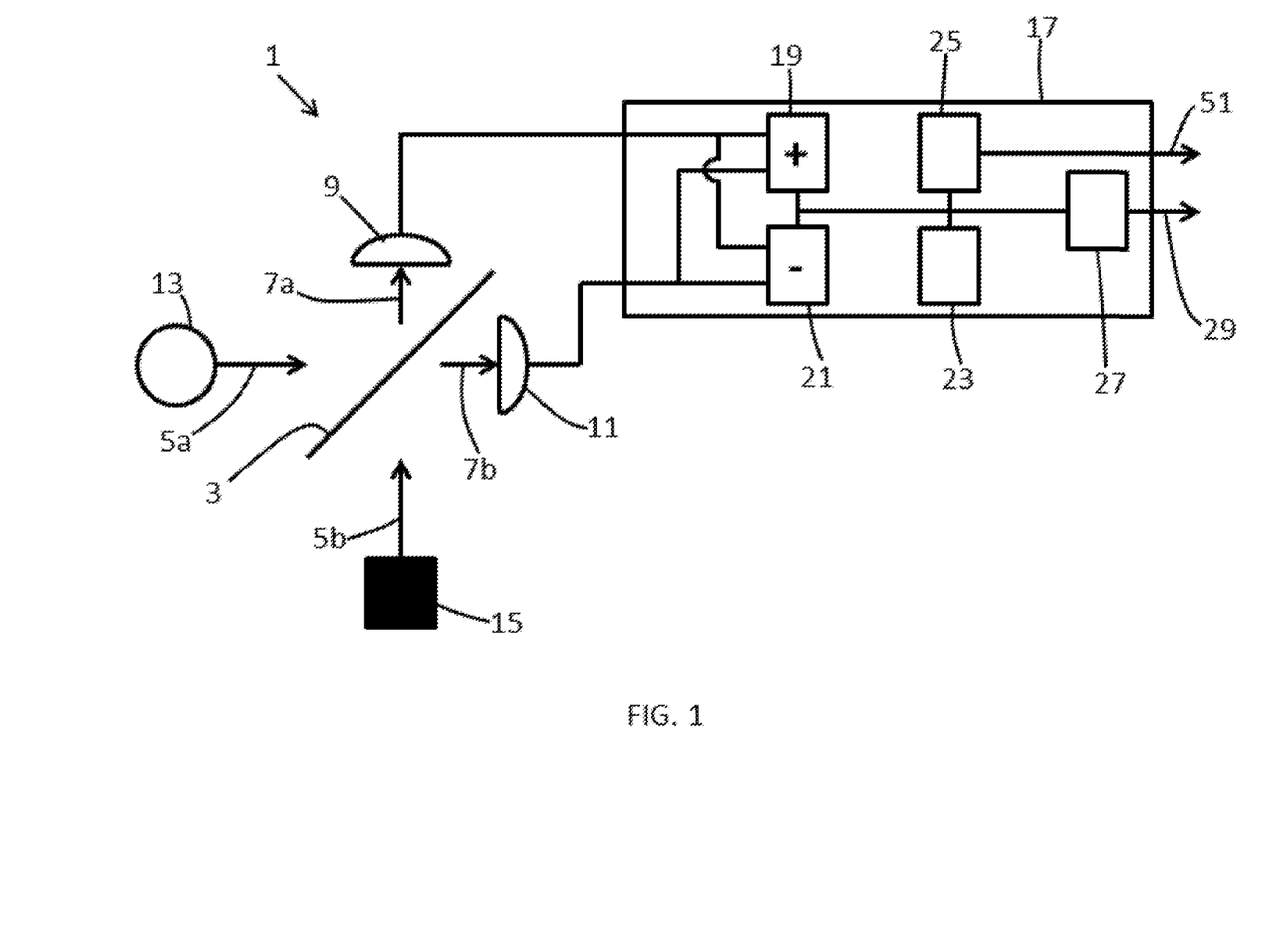
FIG. 1 schematically illustrates a random number generator according to an example embodiment of the invention.

FIG. 1 schematically illustrates a random number generator 1. The random number generator 1 includes a mode mixer 3 for mixing quantum modes of particles, a pair of detectors 9, 11 to measure the output from the mixer 3, and a controller 17 to process the measured output.

At the first input 5a of the mode mixer 3, a bright quantum state is provided from a light source 13. A bright quantum state refers to a quantum state comprising many particles (more than 2 particles; typically many hundreds or thousands) in the same mode.

At the second input 5b of the mode mixer 3, a vacuum input 15 is provided. In other words, there are no input particles provided at the second input 5b. An input that is below the threshold sensitivity of the detectors will also be considered a vacuum input.

Therefore, the bright quantum state can be considered to be mixed with a vacuum input at the mode mixer 3, and the input of the two-mode mixer 3 can be described by the state $|n,0\rangle$, where there are n particles in the bright quantum state.

The mixer 3 is a 50:50 two-mode mixer, which has two inputs 5a, 5b and two outputs 7a, 7b. A two-mode mixer is a mode mixer 3 arranged to mix two inputs to provide two output modes. A 50:50 mixer is a mode mixer 3 at which an input particle at a first input 5a is randomly detected at either of the two outputs 7a,b after mixing, and has an equal chance of being detected in either of the output modes. The mode mixer 3 mixes the first and second modes at the inputs 5a,b to provide the first and second modes at the outputs 7a,b.

The output of the mode mixer 3 can be described by the state |a,b> where a is the number of particles in the first mode, b is the number of particles in the second mode and a+b=n.

A first detector 9 is arranged at the first output 7a, to detect particles in the first mode, and a second detector 11 is arranged at the second output 7b, to detect particles in the second mode.

The output of the detectors 9, 11 is a signal (for example voltage or current) proportional to the number of particles detected. As will be discussed below in more detail, the detectors 9, 11 may be calibrated, so that the number of particles in each mode (a and b) can be calculated.

Where a and b are sufficiently high, the detectors 9, 11 can be linear photodiodes, which are simpler to implement than the detectors in systems requiring single photon sensitivity. The number of particles required in each output mode to be able to use photodiodes depends on the sensitivity of the photodiodes, but typically, for photodiodes to be used as the detectors 9, 11, a and b should both be above 50.

The output of the detectors 9, 11 is provided to the controller 17, which uses the calibration of the detector 9, 11 to determine the number of particles in the two modes (a and b). The controller 17 includes a summing module 19, which derives the total number of particles in the two modes (a+b), and a difference module 21, which derives the difference between the particles in the two modes (a−b or b−a).

As discussed above, when photons in the first mode are incident on a 50:50 mode mixer 3, there is an equal probability that each photon will be output in the first mode, at the first output 7a, or in the second mode, at the second output 7b. Since the input photons can be randomly detected at either output 7a,b, a and b will vary randomly over time, and so the difference between the number of particles in each mode will also vary randomly.

This randomness is a result of the quantum mechanical process of probabilistic splitting, and so the variation in the difference between the number of particles in each mode can be used to generate random numbers.

Without the mode mixer 3, the measured difference between the two modes will always be |a−b|=n, since the input includes only a single mode. With the mode mixer 3, a−b will vary randomly as discussed above. Therefore, the measurements with and without the mixer can be considered conjugate, since one of the two values can be known accurately, and so has low variation/entropy, the other cannot, and so has high variation/entropy.

The high entropy measurement can be used to generate random numbers, whilst the low entropy measurement can be used to certify the random numbers using the Heisenberg uncertainty principle—whilst the total value of a+b can be known (and has low entropy), the difference of a and b cannot be known (and has high entropy).

Normally, measurements in conjugate bases cannot be taken at the same time. However, since one of the input states 5b is fixed as a vacuum, we can use the simultaneous measurements of n=a+b and a−b to predict the outcome of the conjugate measurements, and so both the high entropy and low entropy measurement can be taken at the same time.

The total number of particles can be used to certify that the process by which the numbers are generated is quantum in origin, and so the numbers generated are random. In at least some embodiments, certification can be carried out without having to know the number of photon input to the mixer 3.

Figure 2A:
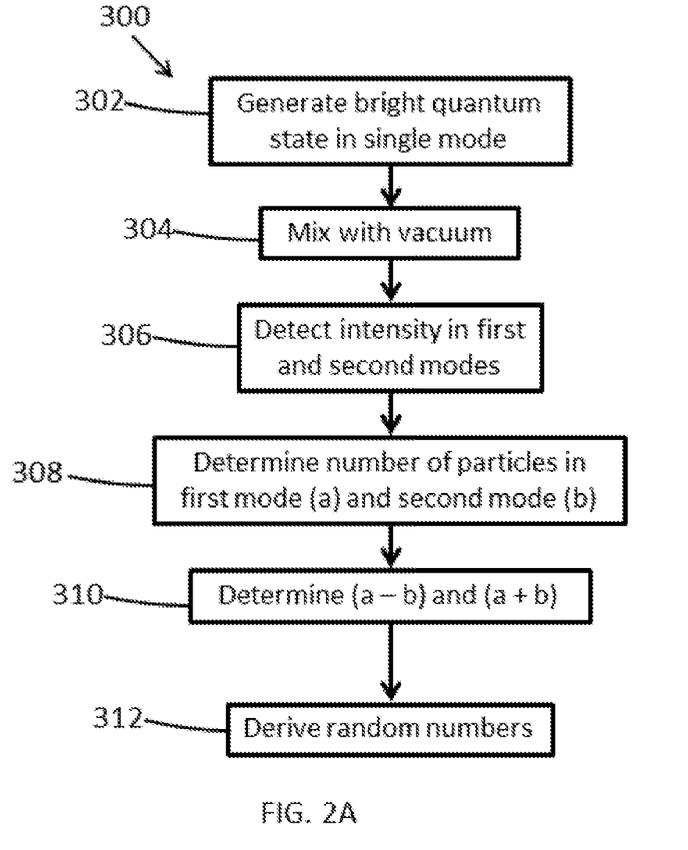
FIG. 2A illustrates a method for generating random numbers according to an example embodiment of the invention.

In general, the random number generator 1 is operated using a pulsed light source 13. The process of generating random numbers 300 based on a single pulse is shown in FIG. 2A.

As a first step, a pulse of the single mode bright state is generated 302. The mode is then mixed with a vacuum 304, and the intensity in each mode is detected 306. The detected intensity is then processed to determine 308 the number of particles in each state (a and b).

At step 310, the difference between the number of particles in the two modes and the total number of particles are determined, and at step 312 random numbers are derived by a random number extractor 27, using the difference and total.

Random number extractors 27 are known in the art. Random number extractors 27 use algorithms that use a partially random string of length k and a random seed of length approximately equal to log(k) as inputs, and outputs a string of random numbers of length equal to log(k). The random number seed can be taken from earlier results of the random number generator 1, or any other suitable secure source, free from influence or prediction of other parties. The random number seed need not be certified random numbers, for example it may be generated by an algorithm. However, the output of the extractor 27 will still be certified numbers as discussed below. Random number generators typically use a random seed in this way, and so are sometimes also considered random amplifiers.

In at least some embodiments, the random number extractor 27 relies on a one-way function (a function in which the input can be computed to provide the outputs, but the outputs cannot be inverted to find the inputs).

One example of a group of one way functions that can be used is hashing functions. Hashing functions can also be used to remove any possible classical effects in the system. The entropy in the system can be determined, using an entropic uncertainty relationship, based on the total number of particles detected (n=a+b). In general high n means high entropy. The entropy fixes the hashing fraction required for the randomness extractor 27 to provide a secure random output. The hashing of the intensity data produces a secure string of random numbers.

Figure 2B:
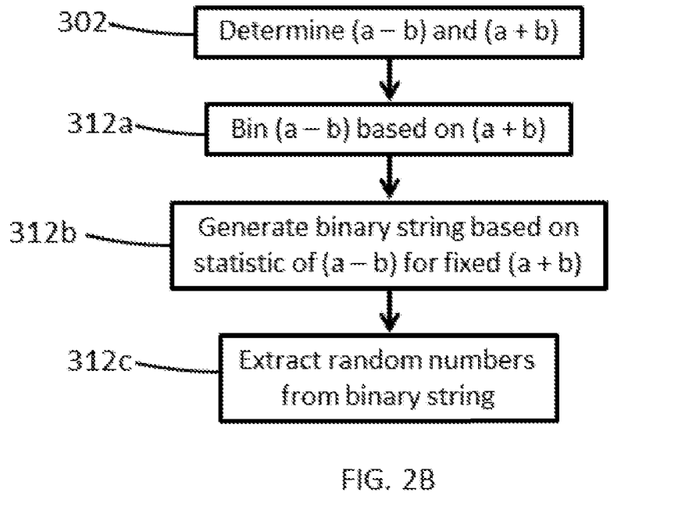
FIG. 2B illustrates the step of deriving the random numbers from FIG. 2A, in more detail.

The process of deriving 312 the random numbers is shown in more detail in FIG. 2B, and discussed in relation to FIGS. 1 and 2B.

In order to derive the random numbers 312, the output of the summing module 19 and difference module 21 are provided to a binning module 23. The binning module 23 includes separate bins for each different value of n=a+b. Within each bin, there is a set of statistics for the variation of a−b, for all measurements with the same n.

As discussed above, for each pulse, the total number of particles n=a+b is determined in step 310. In at least some embodiments, the minimum number of particles that could have resulted in the measured signals is determined, rather than the exact amount. This is achieved by the calibration of the detectors 9, 11, as discussed below.

As also discussed, in step 310, the difference between the number of particles in each mode is determined. At step 312a, the difference is added to a bin holding statistics on the difference for all pulses with the same total number of particles.

A binary string is generated 312b from the statistics of a−b in the particular bin for that pulse. The output of any detector is digitised into a number of bins. The log of the number of bins is referred to as the bit depth. Where there is noise on the system, a number of bins can be grouped together, when digitising, to help reduce the impact of the noise. This reduces the bit depth of the system, since there are fewer bins. The length (m) of the binary string generated from the statistics of a–b depends on the bit depth of the detection system used, after the technical noise is taken into account.

Typically, m is less than or equal to n, since there will be some noise. If there is no noise, m=n.

The total number of particles detected (n=a+b) is provided to a certification module 25, which determines the number of random numbers that can be generated as log(n), whilst still be certified as truly random. Extracting more random numbers than this limit would result in the numbers including predictable elements from the extractor 27.

The binary string, and the total number of random numbers that can be generated is provided to the random number extractor 27, along with a random seed of the correct length. The random number generator 27 then generates the random numbers in the manner discussed above.

Over a series of pulses, each particular measurement of a and b is random. However, over time, both a and b will tend to an average of n/2, since the mixer 3 is a 50:50 mixer. If n is above a minimum threshold, selected to ensure sufficient randomness in the system and the states are suitably bright to be detected, then the numbers are certified as random. If either of these criteria is not met, the numbers are not certified.

The certification module 25 may provide an output 51 providing the certification status of the numbers. Furthermore, the certification module may stop generation of random numbers if the numbers are not certified, for example, if n drops below the threshold.

It will be appreciated that, assuming the mixer 3 is a true 50:50 mixer, and the vacuum input is a true vacuum input, the certification is independent of the source and the implementation of the detectors, and is instead an underlying check that the process generating the randomness is truly quantum.

Since the random number extractor 27 can extract up to log(m) random numbers from a string of length m that is at least partially random, provided the length of the string is above a threshold, and the mixer is a 50:50 mixer, the numbers generated can trusted (and hence certified) as being truly random, and based on a quantum mechanical effect.

It will be further appreciated that the same arrangement of the system is used for both generation of random numbers, and certification. Therefore, the processes of generation and certification can be carried out in parallel, at the same time.

In at least some embodiments, the random number generator 1 provides certified random numbers based on a quantum process. The measurements for generating random numbers and certification do not need to rely on an auxiliary trusted source. As such the random number generator is secure against fluctuations in the inputs to the measurement system, or indeed malicious control over those inputs.

In at least some embodiments, the measurements for generating random numbers and certification are based on a bright state, and so a simple measurement system can also be used, and since only a single bright state is required, a simple light source 13 can be used.

Any light source 13 that generates a suitable number of photons could be used to generate the bright state provided at the first input 5a. Furthermore, any suitable mode may be used. For example, the detectors 9, 11 may be arranged to detect horizontally and vertically polarised light, and the input mode may be either horizontally or vertically polarized light.

In the example shown in FIG. 1, the mixer comprises 2 spatially separated inputs 5a,b. In this case, the vacuum input 15 is provided by simply ensuring there are no photons at the second input. However, it will be appreciated that this may be for illustration only. In reality, the two inputs may be spatially indistinct. In this case, the vacuum input is achieved by ensuring that only photons in a single mode are provided.

Many light sources produce light in a number of different modes. Therefore, the random number generator 1 may include frequency and polarisation filters (not shown) to ensure that only the selected polarization mode reaches the mixer 3.

Examples of light sources that could be used are light bulbs (halogen, fluorescent and the like), multi-mode lasers or light emitting diode (LED), or even sunlight or other light sources. Alternatively, the light source 13 may comprise a source that generates light in only a single mode, such as a single mode laser, LED or the like.

Different light sources will provide different numbers of incident photons in each mode, and the number of photons in a mode will vary for a single light source. Furthermore, an incorporated light source may vary depending on many factors, such as age, environment, power supply and the like. However, the generation of random numbers is independent of the variation in n, since it simply uses n to determine how many random numbers can be generated.

Figure 3:
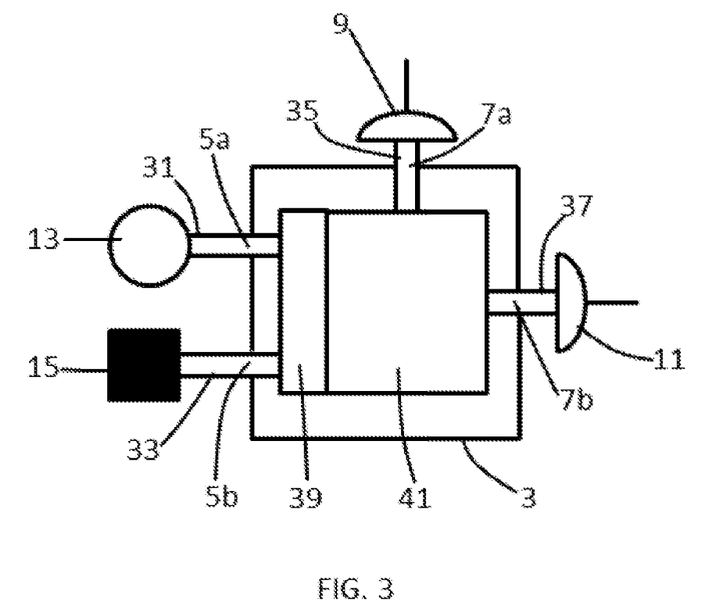
FIG. 3 schematically illustrates an example implementation of the mode mixer and detectors of the random number generator in FIG. 1.

In some examples, the mode mixer 3 may by a fibre coupled mode mixer, as shown in FIG. 3. In this case, there are two physically distinct inputs 5a, 5b to the mixer 3, and two physically distinct outputs 7a, 7b.

The first input 5a is coupled to the light source 13 by a first fibre optic 31. Similarly, the second input is provided via a second fibre optic 33. Furthermore, each output 7a,b is coupled to its respective detector 9, 11 by a corresponding fibre optic 35, 37.

Fibre optics can be single mode, therefore, the use of a single mode fibre 31 for coupling the light source to the first input ensures only a single mode reaches the mixer 3, and only the desired mode reaches the detectors 9, 11. The vacuum input can simply be provided by closing the end of the fibre optic 33 coupled to the second input 5b.

Fibre optics can also be multi-mode. In this case, frequency and polarisation filters can be used to ensure a single mode input. Fibre optics can also work where there are not spatially distinct inputs 5a,b, since again only a single mode reaches the mixer 3.

The first input 5a may include light polarized in either the vertical or horizontal direction, and the mixer 3 may include a birefringent element such as a quarter wavelength ($\lambda/4$) waveplate 39, and a 50:50 polarising beam splitter 41. The polarising beam splitter 41 is arranged to reflect horizontally polarized light, and transmit vertically polarized light (or vice versa). Therefore, the different modes of light are directed to different detectors 9, 11.

Horizontally or vertically polarized light incident on the waveplate 39 is rotated by 45 degrees so that the light is diagonally polarized. Diagonal modes can be considered as a superposition of horizontal and vertical modes. Therefore, when a single photon of diagonal polarization hits a 50:50 polarizing beam splitter 41 that reflects horizontally polarized light, and transmit vertically polarized light (or vice versa), it has an equal chance of being detected at the horizontal output or the vertical output.

This principle can be applied to fibre coupled or non-fibre coupled embodiments.

In at least some of the above examples, the light source 13 is not pulsed. In such cases, the output of the detectors 9, 11 is continuous. However, in such cases, the controller 17 of the random number generator 1 may be arranged to sample the outputs, in order to replicate the effect of pulsing, and so the above description is applicable.

The pulses or samples should be sufficiently spaced so that there is no interference between consecutive pulses. This is limited by the response time of the detectors 9, 11. In one example, GHz photodiodes may be used, so the pulses may be spaced by approximately 1 ns.

In at least some embodiments, the light source 13 is contained within the random number generator 1. In these cases, the random number generator 1 is received within a single housing (not shown).

In other embodiments, the light source 13 is separate to the rest of the system, and separate from the device including the mode mixer 3, detectors 9, 11 and controller 17. In this case, all components apart from the light source are received in the single housing, and the random number generator 1 may include a collector (not shown) for receiving light form the light source 13. The collector may simply be an opening in the housing, or some other receiver that directs photons to the mixer 3. The collector may collect a single mode, or may include filters, as discussed above.

When a collector is used, the light source 13 may be any suitable light source, and may even be under the control of an adversary who is attempting to influence or intercept the random numbers generated.

In at least some embodiments, all of the components may be implemented as solid state devices, making the random number generator 1 simple to manufacture. Once the components have been assembled and connected, they may be provided in the housing to provide a random number generator unit (not shown). The unit may measure only a few centimetres in any direction. The unit may include a battery, or a connection to a power supply for powering the components.

It will be appreciated that in some embodiments, a trusted light source or light sources can be used in order to calibrate the detectors 9, 11. Typically a detector 9, 11 has a fixed relationship between the number of photons detected and the output signal that is known (for example linear). By measuring the output signal for different known inputs of photons, the detector 9, 11 is calibrated. A single light source having variable power, where the output number of photons is determined by the power, or different light sources having different outputs, could be used.

In order to ensure that the numbers extracted are truly random, the detectors 9, 11 should be conservatively calibrated, so that they either exactly estimates a and b based on the measured signals, or underestimate them. As discussed above, the random number extractor 27 extracts a number of random numbers based on n=a+b. If n is over estimated, then the extractor 27 will extract more random numbers than possible, and the random numbers will include a systematic element from the extractor 27, which could be predicted.

In some examples, the calibration can also be used to calibrate the shot noise in the random number generator 1, so that this can be discounted when generating the random numbers. In general, shot noise is proportion to $\sqrt{n}$. Therefore, if a variable power light source (as discussed above) is used, then the noise can be measured as a function of n, and the noise can be calibrated.

There may be technical noise on the system, in addition to the shot noise. The technical noise is fixed, and does not depend on n. The technical noise sets a minimum threshold number of particles at which a signal is detected. Calibration of the noise also helps to determine the minimum threshold of input particles that can be used. The minimum threshold should be selected to ensure that the output power is above the technical noise threshold. This means that the shot noise is larger than the technical noise. The shot noise is quantum in original, and so above the technical noise threshold, the signal is dominated by quantum effects.

In one example the minimum threshold is n=500. As discussed above, this is above the threshold required for use of photodiodes in the detector 9, 11.

It will be appreciated that n may vary from pulse to pulse, but it should be above this threshold.

Calibration can be done prior to assembly of the random number generator, or after. In some embodiments, separate light sources may be used for the calibration. The light sources required for the calibration are more complex than the light source 13 for use in random number generation, since the input number of photons n must be know. However, the complex light source is only required for calibration, and not for generating numbers. This means that the need for complex light sources is reduced, since the same light source could be used to calibrate many random number generators 1.

Alternatively, in some embodiments, the random number generator 1 may include a calibration light source.

In some examples, the detector and shot noise calibration may be carried out from time to time, as a check of the random number generator 1.

A further check of the random number generator 1 can be achieved by disengaging the mixer 3 in some way. This may be physically removing the mixer 3 out of the light transmission path. Alternatively, in the example of a waveplate 39, rotation of the waveplate by a fixed angle may cause light to pass through without being mixed.

As discussed above, with the mixer disengaged, all photons will be in a single mode. Therefore, the difference between the number of photons in each mode will be constant, at n. Checking this allows for a check of the random number generator 1. Furthermore, monitoring of difference in the number of photons in each mode, without the mixer 3, provides an alternative way of certifying the random numbers, albeit not at the same time as generating the random numbers.

Figure 4:
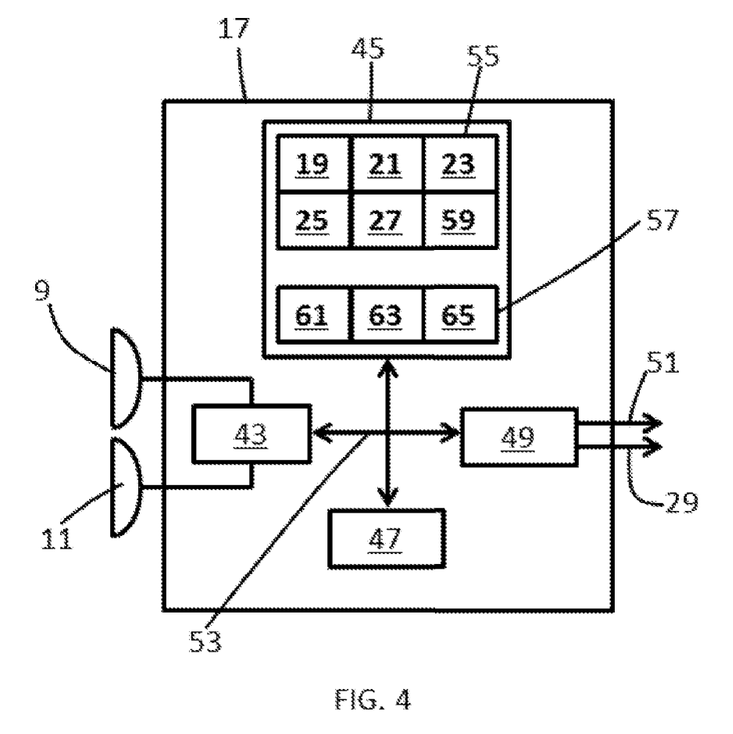
FIG. 4 illustrates an example implementation of the controller of the random number generator in FIG. 1.

It will be appreciated that the controller 17 can be provided by any suitable processing unit. FIG. 4 shows one such example.

In this example, the controller 17 includes an input system 43 arranged to receive the signals from the detectors 9, 11. The controller 17 further includes a memory 45, a processing unit 47, and an output system 49 arranged to provide the random numbers 29 and the certification output 51. In at least some embodiments, the random numbers and certification may be provided on a display or a communications interface such as USB, BlueTooth, Wifi, or other any wired or wireless connection.

The processing unit 47 may be an Intel® X86 processor such as an i5™, i7™ Athlon™, Sempron™, Phenom™, A5, A7 processors or the like. The processing unit may also be a field-programmable gate array. The processing unit 47 is arranged to communicate, via a system bus 53, with the input system 43, memory 45 and output system 49.

The skilled person will appreciate that memory 45 may be provided by a variety of components including any form of machine readable data carrier such as volatile memory, a hard drive, a non-volatile memory, etc. Indeed, the memory 45 comprises a plurality of components under the control of the, or otherwise connected to, the processing unit 47.

In other embodiments at least a portion of the processing unit 47 and memory 45 may be provided remotely.

Typically, the memory 45 provides a program storage portion 55 arranged to store program code which when executed by the processing unit 47 performs an action and a data storage portion 57 which can be used to store data either temporarily and/or permanently.

The program storage portion 55 comprises the sum module 19, the difference module 21, the binning module 23, the certification module 25 and the random number extractor 27, which are operated in the manner discussed above. The program storage portion may also include a calibration module 59, which can operate the calibration processes discussed above, and also convert the input signals to the corresponding values of a and b.

The data storage portion 57 may include a data bin 61 for storing the data analysed by the binning module 23, a calibration data store 63 for holding the calibration data associated with the detectors 9, 11, and a threshold data store for holding the thresholds for certifying the random numbers (the minimum value of n).

In other examples, the controller may be provided differently. For example, the difference module 21 may be provided by a differential amplifier, and the sum module by an additional amplifier.

In the above description, the example of orthogonal directions of polarisation (vertical and horizontal) of photons is used for the two modes.

However, it will be appreciated that the modes can be implemented in a variety of systems. For example, different bosonic systems may be used instead of photons. Examples of other bosonic systems include optical or microwave excitations (photons), quantized mechanical excitations (phonons), bound electron-hole pairs (excitons) or strongly coupled light-matter excitations (plasmons and polaritons). In other examples, cold atoms or trapped ions, superconducting circuits or mechanical degrees of freedom could be used. Different systems may have different thresholds required to generate certified random numbers.

The two modes can be defined with reference to any degree of freedom of the system used. For example, the modes could be different temporal modes, frequency modes, spectral modes, polarisation modes or spatial modes. The modes could be delineated by non-overlapping fixed-width channels (time bins or frequency bins or spatially separated waveguide modes) or they could be distinguished by overlapping field-orthogonality conditions (as in code-division multiplexing, or encodings based on orbital angular momentum).

For optical input states the mode mixer 3 can be implemented by a beam splitter to mix two spatial modes. Alternatively the mode mixer 3 could be any suitable mixer for mixing optical modes, such as a Raman interaction, quantum memory or an electro-optical element. The mixer 3 may be considered a means for mixing the modes.

Devices with equivalent mode-mixing functionality could be employed for microwave, phononic, excitonic, polaritonic or other bosonic implementations. For example, a directional coupler could be used to mix microwave modes and a low-loss noise-free coupler can be implemented in superconducting circuits. For exciton-polariton systems in semiconductor quantum well structures, a beam splitter could be implemented by engineering a double-well structure using a pump mode with two spatial lobes, such that tunneling between the two lobes is possible.

Where the mixer 3 can be controlled so that it does not mix (i.e. it is disengaged), this can be achieved through any suitable mechanism. In the above, the examples of moving the mixer 3 out of the transmission path, and rotation have been discussed. In other examples, depending on the type of mixer, applying or removing a voltage or physical (piezoelectric) force may achieve the same result.

Any suitable detector for detecting the intensity of the modes can be used. The type of detectors used will depend on the states used at the input. For example, optical intensity detectors 9, 11 could be implemented with linear photodiodes, as discussed above, or microwave intensity detectors with antenna/amplifier systems, atom intensity detectors with absorption or fluorescence measurements, superconducting intensity detectors with Josephson junctions or SQUID amplifiers, mechanical intensity detectors with Raman or Brillouin scattering measurements. The detectors may be considered means for detecting the intensity of each mode.

In other examples, the detectors 9, 11 may be one of the following: nanowire detectors, superconducting transition edge sensors, superconducting kinetic inductance detectors, avalanche photodiodes, photomultiplier tubes, CCD detectors, or CMOS detectors.

In the above example, the input is described as being single mode. However, it will be appreciated that if the mode mixer 3 and detector 9, 11 respond to all modes in a similar fashion, then the input could include multiple modes. For example, if the mode mixer 3 is a 50:50 mode mixer for both horizontal and vertical polarizations then the input can include both polarizations, and the random number generator 1 will function as described above. However, if the mixer 3 was 50:50 for horizontal polarization but 90:10 for vertical (such that a vertically polarized input will go to the first output 90% of the time), then the input should include only horizontal polarization.

The invention claimed is:

1. A method for generating random numbers including:
   mixing a bright quantum state in a first mode with a vacuum input, in a two mode transformation for mixing the first mode with a second mode, orthogonal to the first mode;
   after mixing, detecting the number of particles in the first mode, and the second mode;
   generating random numbers based on the difference between the number of particles in the first mode and the second mode; and
   simultaneously to generating random numbers, certifying the numbers as random, based on the total number of particles in the first mode and the second mode,
   wherein certifying confirms that the process by which the random numbers are generated is quantum in origin and so the numbers are random.

2. The method of claim 1, including generating certified random numbers based on the difference between the number of particles in the first mode and the second mode and the total number of particles in the first mode and the second mode, such that the numbers are certified when they are generated.

3. The method of claim 1, including:
   after mixing, detecting an intensity in the first mode and second mode; and determining the number of particles in the first mode and the second mode, based on the detected intensity.

4. The method of claim 1, wherein after mixing the bright quantum state in the first mode with the vacuum input, each particle is randomly detected in the first mode or the second mode, such that the difference between the number of particles in the two modes has high entropy.

5. The method of claim 3, including:
calibrating detectors used to detect the intensity in the first mode and the second mode, such that the number of particles incident on the detector is estimated based on an output signal of the detector,
wherein the detectors are calibrated to underestimate the number of particles.

6. The method of claim 5, wherein the detector is calibrated with a first source, and the bright quantum state in a first mode is generated by a second source.

7. The method of claim 1, wherein the numbers are certified as random if the total number of particles in the first mode and second mode is above a minimum threshold.

8. The method of claim 1, including:
for a plurality of measurements, grouping the results based on the total number of particles in the first mode and the second mode; and
for each measurement, generating random numbers based on the difference between the number of particles in the first mode and the second mode recorded for measurements with the same total number of particles.

9. The method of claim 1, wherein the bright quantum state comprises photons collected from an incident light source.

10. The method of claim 1, wherein the modes are selected from at least: optical polarisation modes; spatial modes; temporal modes; and spectral modes.

11. The method of claim 1, including:
generating the bright quantum state, such that the state is pulsed; and
detecting the number of particles in the first mode and second mode for each pulse.

12. A random number generator including:
a mode mixer to mix a first mode of a quantum state with a second mode, orthogonal to the first mode, in a two mode transformation;
a source for providing a bright quantum state in the first mode to the mode mixer;
a vacuum input to the mode mixer, such that the first mode is mixed with the vacuum input;
a detector arranged to detect the number of particles in the first mode and the second mode after mixing; and
a controller arranged to:
generate random numbers based on the difference between the number of particles in the first mode and the second mode; and
certify that the process by which the random numbers are generated is quantum in origin, and so the generated numbers are random, based on the total number of particles in the first mode and the second mode,
wherein the random number generator is arranged to generate random number and certification that the numbers are random at the same time.

13. The random number generator of claim 12, wherein the controller is arranged to generate certified random numbers based on the difference between the number of particles in the first mode and the second mode and the total number of particles in the first mode and the second mode, such that the numbers are certified when they are generated.

14. The random number generator of claim 12, wherein the detector includes:
a first detector for detecting the first mode; and
a second detector for detecting the second mode.

15. The random number generator of claim 12, wherein the controller includes:
a binning module to group separate measurements, based on the total number of particles in the first mode and the second mode, wherein
the controller is arranged to generate random numbers based on the difference between the number of particles in the first mode and the second mode recorded for measurements with the same total number of particles in the first mode and the second mode.

16. The random number generator of claim 12, wherein the source is pulsed, and wherein random numbers are generated from each pulse.

17. The random number generator of claim 12, wherein the modes are selected from at least: optical polarisation modes; spatial modes; temporal modes; and spectral modes.

18. The random number generator of claim 12, wherein the mode mixer is a 50:50 mode mixer.

19. The random number generator of claim 18, wherein the mode mixer comprises:
a half wavelength waveplate; and
a polarising beam splitter.

20. The random number generator of claim 12, wherein the mode mixer is coupled to the source and the detector by optical fibres.

* * * * *